Figure 1:
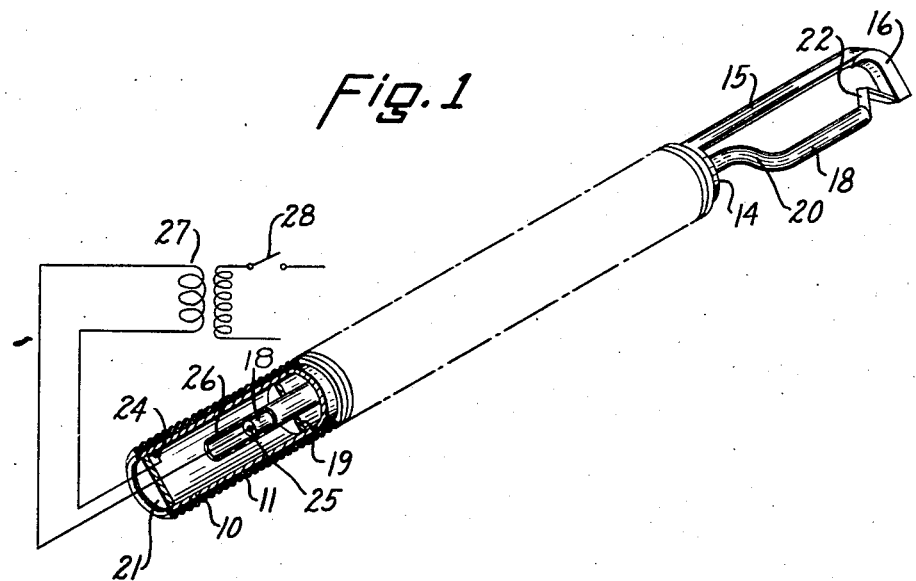

March 12, 1946.  T. W. MOORE  2,396,594
INSULATION REMOVER
Filed Aug. 15, 1942

Inventor
Thomas W. Moore
By Marechal & Noe
Attorneys

Patented Mar. 12, 1946

2,396,594

UNITED STATES PATENT OFFICE 2,396,594

INSULATION REMOVER

Thomas W. Moore, Dayton, Ohio, assignor to The Leland Electric Company, Dayton, Ohio, a corporation of Ohio Application August 15, 1942, Serial No. 455,010

3 Claims. (Cl. 219—29)

This invention relates to the removal of insulation from wire.

It is the principal object of the invention to provide a device for removing insulation from wire which is rapid, efficient, and effective in operation, which is inexpensive to manufacture and to operate, and which completely removes the insulation from the entire circumference of the wire without imposing any damaging strain upon the wire which might cause breakage thereof.

It is a further object to provide such a device which accurately removes the insulation over a predetermined length of the wire as desired.

It is also an object to provide such a device in which the insulation is removed from the wire by a part which is electrically heated and in which adequate protection is afforded against causing injury or damage to the operator or to any surface with which it may accidentally come in contact.

Other objects and advantages of the invention will be apparent from the following description, the appended claims, and the accompanying drawing.

Figure 2:
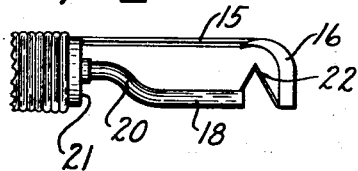

In the drawing,

Fig. 1 is a view in perspective with parts broken away showing a device constructed in accordance with the present invention; and Fig. 2 is a side elevational view of the end of the device showing the protected arrangement of the heated part.

In the handling of wire which carries an insulating coating, considerable difficulty may be encountered in removing the insulation from that part of the wire to which a connection is to be made, such being the case both in removing a fibrous insulation, and in removing a coating of insulating enamel or the like. Particularly in the case of fine wire, such as is used in armature windings of small sized motors and in other similar uses, it is a difficult problem to hold the wire while the insulation is scraped or removed therefrom by abrasion, the exertion of the forces necessary to effectively remove the insulation by such methods frequently resulting in the breaking of the wire itself. The problem is of particular importance in cases where connection is to be made to a large number of separate wires of small size, such as where a large number of these wires are separately connected to commutator bars of a small motor, or the like.

The present invention provides a device which is simple and yet highly effective for quickly and completely removing insulation from the wire, and over the desired extent of the wire. The remainder of the insulation is not impaired, and their is no damage to the wire itself since there is no strain comparable to that imposed by a scraping, cutting or abrading action.

Referring to the drawing which discloses a preferred embodiment of the invention, there is shown a main tubular shaped body member 10 which is constructed of suitable material, preferably in the form of a copper or brass tube of suitable dimensions to serve as a handle. For convenience in handling, the outer surface of the tube is wrapped with a suitable material such as cord 11, which is wrapped around the periphery of the tube in a spiral manner, and secured in place by means of an adhesive such as shellac or the like, thus affording a convenient gripping surface as well as insulating the outer surface of the tube.

At one end, the major part of the circumference of the tube is cut away as indicated at 14, leaving only a relatively narrow part 15 projecting forwardly of the main body of the tube and forming a rear protective member for the heating element. To this projecting part 15 there is secured an end connector member or guard 16 which is bent forwardly and in a direction generally transverse to the axis of the tube. It is conveniently secured to the end of the protective member 15 by means of welding or the like.

Another conductor 18 is supported from the tube, being preferably located centrally of the tube and retained there by means of a series of insulating spacer discs 19. It projects from one end of the tube and is provided with an offset bend indicated at 20 which provides for supporting the end portion substantially parallel and in spaced relation with the rear protective member 15 and it terminates adjacent the end of the connector 16. A suitable insulating closure 21 is preferably provided at either end of the tubular part of the member to close the interior of the tube.

A heating element in the form of a flat ribbonlike strip 22 is bent into the form of a V, and the ends of the strip remote from the apex of the V are secured respectively to the connector 16 and to conductor 18. Preferably the apex of the V is arranged to point inwardly, or toward the rear protective member 15, the heating element being thus largely enclosed and protected against accidental contact with either the hand of the user or with a surface upon which it is supported. The width of the ribbon may be selected as desired, being preferably of a width comparable with that of the members 15 and 16 which enclose and protect it against accidental contact. A satisfactory width has been found to be from about ⅛ to ³⁄₁₆ inch.

Electrical connection is made to the tube 10 as indicated at 24 and to the central conductor 18 as indicated at 25. Preferably a piece of rubber tubing 26 is fitted over the end of conductor 18 to fully insulate the connection, and to prevent the connecting wire from being broken off in the normal handling of the device.

The electrical energy is suitably supplied from a step down transformer 27 the primary of which may be controlled by a manual switch 28 and supplied with energy from the usual lighting circuit. It is found preferable to utilize a step down transformer to supply low voltage, high current power to the heating element, to thereby avoid any possibility of electric shock to the operator in the use of the device. As an example, a voltage of 2 to 3 volts may be used with a current flow of about 15 amperes. This permits the use of a direct self-supporting heater element in contrast with an indirect coil heater necessitated for high voltage operation.

In operation, the switch 28 is closed and the current rapidly heats the element 22 to a suitable temperature, usually a dull red heat. The heater may be allowed to continue in operation indefinitely, with only very minor use of power. The device may then be manipulated by hand as desired, the wires from which the insulation is to be removed being laid into the apex of the V with that part from which it is desired to remove the insulation in contact with the ribbon. The action of the device is practically instantaneous, the temperature of that part of the wire in contact with the ribbon being quickly raised to such a point that the insulation is burned off from the section desired, without impairing the insulation of the remainder of the wire, and without imposing any strain thereon such as might result in breakage. If it is desired to remove the insulation from an extended length of the wire, the wire may be drawn along the ribbon in contact therewith for as far as such removal is desired, the rate of travel of the wire being such that the part in contact with the ribbon is permitted to come to a sufficient temperature to effect removal of its insulation. The tool may be readily carried in the hand of the operator, or may be allowed to rest on a supporting surface such as a table, and in all cases the arrangement is such that the heating element is adequately protected and does not cause any damage to the user or to the supporting surface.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device of the character described for removal of insulation from wires comprising a protective member, a connector at the end of said protective member, a supporting conductor spaced from said protective member, and a heating element in the form of a flat ribbon of electrical resistance wire bent into the form of a V and having its ends remote from the apex of the V substantially parallel and respectively connected to and supported by said connector and said conductor and adapted to be heated to a temperature sufficient to remove the insulation from a length of the wire placed in contact therewith.

2. A device of the character described for removal of insulation from wires comprising a protective member, a connector at the end of said protective member, a supporting conductor spaced from said protective member, and a heating element in the form of a flat ribbon of electrical resistance wire bent into the form of a V and having its ends remote from the apex of the V substantially parallel and respectively connected to and supported by said connector and said conductor, said element having the apex of said V extending toward said protective member, said heating element being adapted to be heated to a temperature sufficient to remove the insulation from a length of the wire placed in contact therewith.

3. A device for removing insulation from wires comprising an elongated tubular body, a protecting portion projecting beyond said body from one end thereof, a connector supported from said projecting end and extending generally transversely of said tubular body, a conductor carried by said body, means for insulating said conductor from said body, said conductor terminating adjacent said connector member, and an electric heating element in the form of a ribbon-like member bent into substantially flat V-shape and supported at its ends remote from the apex of the V by said conductor and said connecting member and adapted to be heated to a temperature sufficient to remove the insulation from a length of wire placed in contact therewith, the apex of the V projecting inwardly toward said protecting member to be partially enclosed and fully protected against accidental contact therewith.

THOMAS W. MOORE.